United States Patent [19]

Huggins et al.

[11] 4,003,740
[45] Jan. 18, 1977

[54] RECOVERY OF COPPER FROM COPPER SULFIDE ORES CONTAINING COPPER AND IRON

[75] Inventors: Dale K. Huggins, Golden, Colo.; Lowell R. Anderson, Morristown; Fred J. Gefri, Hackettstown, both of N.J.

[73] Assignee: Allied Chemical Corporation, Morris Township, N.J.

[22] Filed: Jan. 6, 1976

[21] Appl. No.: 646,807

[52] U.S. Cl. .................................. 75/117; 75/6; 75/7; 75/116; 75/121; 75/101 R; 204/108; 423/153; 423/571; 423/577

[51] Int. Cl.² ............................. C22B 15/08

[58] Field of Search ............... 423/571, 577, 153; 75/6, 7, 116, 117, 121; 204/108

[56] References Cited

UNITED STATES PATENTS

| | | | |
|---|---|---|---|
| 59,693 | 11/1866 | Whelpley et al. ............... | 75/117 |
| 1,098,443 | 6/1914 | Hybinette ........................ | 75/117 |
| 1,598,296 | 8/1926 | MacKay .......................... | 75/117 X |
| 1,974,886 | 9/1934 | Young ............................. | 423/153 X |
| 2,128,107 | 8/1938 | Tyrer .............................. | 423/577 |
| 3,726,667 | 4/1973 | Fuchs ............................. | 75/101 R |
| 3,751,240 | 8/1973 | Green ............................. | 75/117 X |
| 3,857,767 | 12/1974 | Gabler et al. ................... | 204/108 |
| 3,880,732 | 4/1975 | Sardisco ......................... | 204/108 X |
| 3,958,985 | 5/1976 | Anderson ....................... | 75/121 X |
| 3,964,901 | 6/1976 | Swinkels et al. ................ | 75/117 X |

*Primary Examiner*—G. Ozaki
*Attorney, Agent, or Firm*—Ernest A. Polin; Robert A. Harman

[57] ABSTRACT

The invention provides a cyclic process for recovering copper from sulfide ores containing copper and iron which comprises reacting the sulfide ore with sulfur dioxide gas at a temperature of at least about 500° C. to form elemental sulfur, removing the elemental sulfur, reacting the residual solids with concentrated sulfuric acid at a temperature of about 180° to 500° C. to form copper sulfate and sulfur dioxide gas, recycling the sulfur dioxide gas for reaction with additional ore, roasting the remaining solids at a temperature of about 400° C. to 900° C., leaching the roasted solids with an aqueous solution to solubilize the copper sulfate and recovering copper from the solubilized copper sulfate. In another embodiment of the invention, the roasting step is eliminated by removing magnetite from the solids remaining after removal of the elemental sulfur.

15 Claims, 1 Drawing Figure

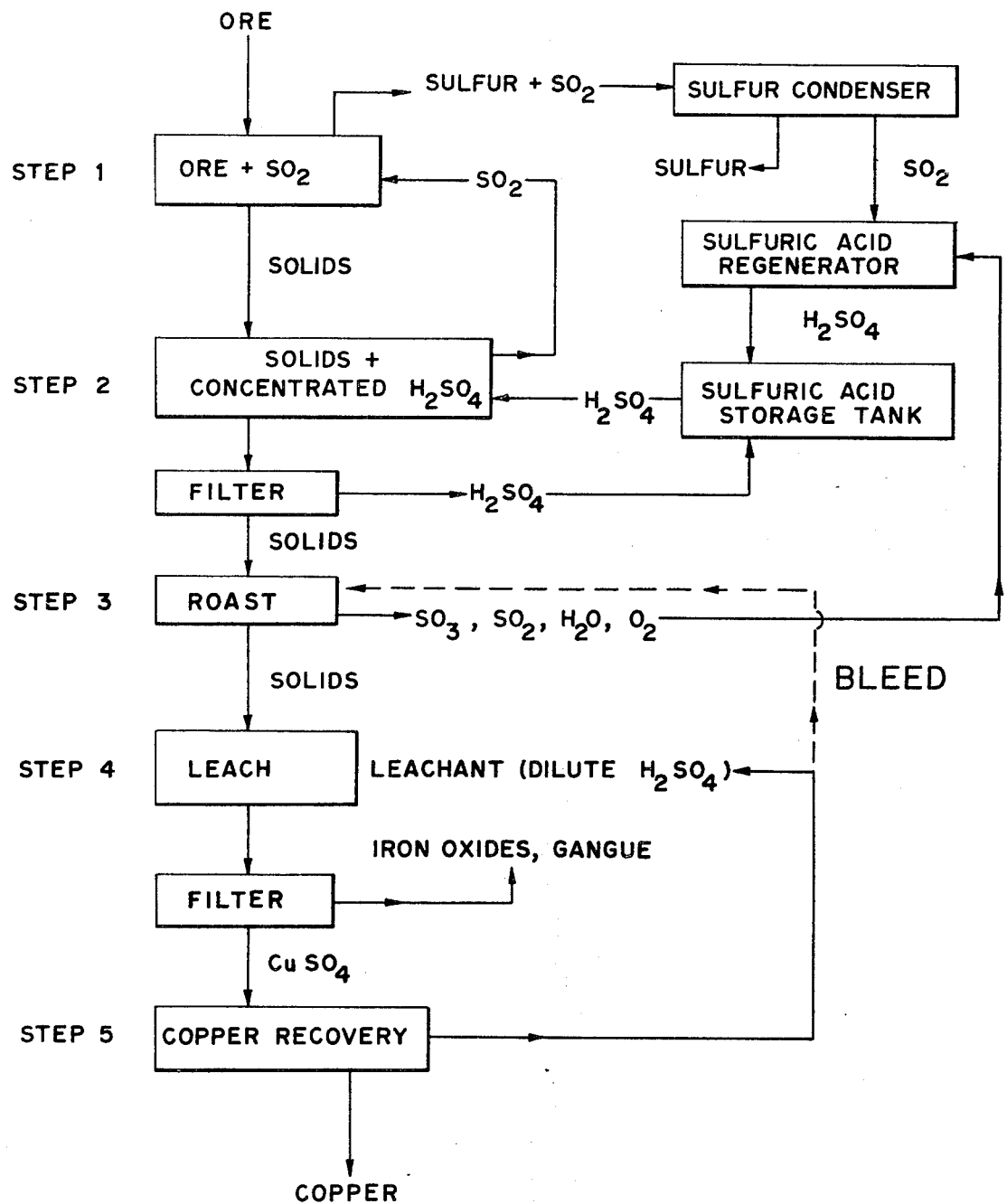

RECOVERY OF COPPER FROM COPPER SULFIDE ORES CONTAINING COPPER AND IRON

BACKGROUND OF THE INVENTION

Most of the primary copper produced in the world is derived from sulfidic copper ores, such as chalcopyrite ($CuFeS_2$). In the conventional processing of sulfidic copper ores to obtain copper, the ore is smelted in air, thereby producing large amounts of sulfur dioxide from the bound sulfur in the ore. In order to meet air pollution control requirements, most of the sulfur dioxide must be recovered in some manner.

Sulfur dioxide emission control processes are expensive and increase the cost of producing copper significantly. In addition, disposal of the recovered sulfur dioxide frequently presents a problem because of its harmful effect upon the environment. Only when the sulfur dioxide is converted into elemental sulfur is the disposal or stockpiling completely satisfactory from the pollution abatement standpoint.

Processes are available for reducing sulfur dioxide to elemental sulfur, including the reaction of the sulfur dioxide with natural gas, carbon monoxide, coal or coke, hydrogen sulfide, carbon disulfide or similar reducing agents. These processes however, are generally considered to be too costly since they are "add-on" processes, i.e. they are not part of the process employed for recovery of copper from the sulfide ore, but rather are added on to the end of the process to dispose of the sulfur dioxide after it has been generated.

Processes for treating sulfidic copper ores have been proposed in which elemental sulfur is formed as part of the decomposition of the ore. In the more significant of these processes, the elemental sulfur is formed by reaction of the ore with concentrated sulfuric acid, aqueous sulfuric acid in the presence of air or oxygen, nitric acid, aqueous ferric chloride, aqueous ferric sulfate, elemental chlorine, etc. All of these processes have been thoroughly investigated, but none of them has achieved commercial success becuase of their expensive nature.

Most sulfidic copper ores also contain significant amounts of iron which, in the recovery of copper, can create a potential pollution hazard. For example, in some processes the iron is disposed of as ferrous or ferric sulfate, basic ferric sulfate or ferric chloride, and dumping of such iron compounds can readily lead to pollution of both the ground and water.

SUMMARY OF THE INVENTION

The present invention is directed to a cyclic process for recovering copper from sulfide ores containing copper and iron. One embodiment of the invention comprises (a) reacting the sulfide ore with sulfur dioxide gas at a temperature of at least about 500° C., thereby forming elemental sulfur, magnetite and a copper sulfide, (b) condensing and removing the elemental sulfur from the reaction mixture, (c) reacting the residual solids with concentrated sulfuric acid at a temperature of about 180° to 500° C., thereby forming copper sulfate and sulfur dioxide gas, (d) recycling the sulfur dioxide gas to step (a), (e) separating the solids comprising magnetite and copper sulfate from the liquid phase, (f) roasting the separated solids at a temperature of about 400° to 900° C., (g) leaching the roasted solids with an aqueous solution comprising water or dilute sulfuric acid, thereby solubilizing the copper sulfate, (h) separating the solids comprising magnetite and gangue from the liquid phase and (i) recovering copper from the solubilized copper sulfate.

Another embodiment of the invention comprises (a) reacting the sulfide ore with sulfur dioxide gas at a temperature of at least about 500° C., thereby forming elemental sulfur, magnetite and a copper sulfide, (b) condensing and removing the elemental sulfur from the reaction mixture, (c) removing magnetite from the residual solids by magnetic separation, (d) reacting the solids with concentrated sulfuric acid at a temperature of about 180° to 500° C., thereby forming copper sulfate and sulfur dioxide gas, (e) recycling the sulfur dioxide gas to step (a), (f) leaching the solids with an aqueous solution comprising water or dilute sulfuric acid, thereby solubilizing the copper sulfate and (g) recovering copper from the solubilized copper sulfate.

DESCRIPTION OF THE DRAWING

The accompany drawing represents a flow sheet illustrating practice of one embodiment of the invention.

DETAILED DESCRIPTION OF THE INVENTION

Although any sulfide ore containing copper and iron may be employed in the present invention, it is preferred to employ chalcopyrite ($CuFeS_2$) as the sulfide ore. Other sulfide ores which can be used in the process of the invention are bornite ($Cu_5FeS_4$), cubanite ($CuFe_2S_3$), idaite ($Cu_{5.5}FeS_{6.5}$) and nonstoichiometric ores approximating or lying between the aforementioned compositions.

The sulfide ore is first reacted with sulfur dioxide gas to form elemental sulfur, magnetite and a copper sulfide (probably cuprous sulfide). This step is described and claimed in copending application Ser. No. 646,777, filed of even date herewith in the names of D. K. Huggins and L. R. Anderson.

The reaction of the sulfide ore with sulfur dioxide gas is carried at a temperature of at least about 500° C., preferably at least about 650° C. The maximum temperature employed is generally not more than about 1,000° C. in order to ensure conversion of a large part of the iron to magnetite. Although it is preferred to carry out the reaction at ambient pressure, elevated pressure may be employed if desired.

The sulfur dioxide gas employed in the process of may be essentially pure gas or may contain other components, such as oxygen, nitrogen, carbon dioxide and water vapor. The sulfur dioxide should be present in at least about a stoichiometric amount with respect to the sulfide ore, and preferably a stoichiometric excess of sulfur dioxide is employed. Smaller amounts of sulfur dioxide can be employed but result in lower yields of elemental sulfur and, hence, tend to become uneconomical.

Although the reaction time is not critical, higher yields of elemental sulfur are obtained by prolonging the reaction time. Generally speaking, significant amounts of elemental sulfur are produced after at least one hour. It is preferred, however, to carry out the reaction for at least about 6 hours. The speed of the reaction depends on the concentration of the sulfur dioxide in the reacting gas, as well as on the reaction temperature. Increasing the sulfur dioxide concentration or the temperature or both will increase the speed of the reaction.

Since the reaction of the sulfide ore with sulfur dioxide gas is considered to be exothermic, the reaction rate is limited by kinetics rather than thermodynamics. Accordingly, large heat inputs are not required. Since energy input is a matter of urgent concern, a process requiring less energy is clearly advantageous. If desired, the heat input may be provided by carrying out the reaction in the presence of a carbonaceous material, such as pulverized coal or coke. The amount of carbonaceous material depends on the type of ore and carbonaceous material employed, as well as on the desired reaction temperature. Alternatively, the sulfur dioxide gas may be preheated or admixed with a suitable amount of oxygen or air to achieve the required reaction temperature.

The elemental sulfur formed by the reaction of the sulfide ore with sulfur dioxide gas may be recovered as liquid sulfur by any conventional condensation technique. The sulfur can be marketed as such and/or employed in the manufacture of sulfuric acid. An additional product of the reaction of the sulfide ore with sulfur dioxide gas is magnetite ($Fe_3O_4$) formed from the iron component in the ore.

Because of the nature of the reaction, i.e., elemental sulfur is formed from both the sulfur dioxide and the bound sulfur in the ore, an amount of elemental sulfur greater than that equivalent to the bound sulfur in the ore can be produced.

The partially decomposed ore is then reacted with concentrated sulfuric acid at a temperature of about 180° to 500° C., thereby forming copper sulfate and sulfur dioxide gas. The sulfur dioxide gas is recycled for use as sulfur dioxide reactant in the initial reaction with the sulfide ore. Since the sulfur dioxide gas contains water vapor, a mist eliminator and condensor unit may be used to remove the water vapor prior to recycling.

The concentrated sulfuric acid employed is generally 98% or above and is used in at least about a stoichiometric amount with respect to the ore. Although a reaction temperature of about 180° to 500° C. is generally employed, it is preferred to employ a temperature of about 300° to 400° C.

The solids comprising magnetite and copper sulfate are separated from the liquid phase and are then roasted at a temperature of about 400° to 900° C. to liberate sulfur trioxide, sulfur dioxide, water vapor and oxygen, which may be employed for reconversion to concentrated sulfuric acid and subsequent recycle, and to form a solid product in which the copper component is soluble in water or dilute sulfuric acid and the iron component is insoluble.

Although the roasting step is generally carried out at a temperature of about 400° to 900° C., it is preferred to employ a temperature of about 600° to 700° C.

The roasted solids are then leached with an aqueous solution comprising water or dilute sulfuric acid to selectively solubilize the copper as copper sulfate. The amount of iron which dissolves in the water or dilute sulfuric acid is negligible.

The dilute sulfuric acid employed in the leaching operation generally has a concentration of about 1 to 5%. An amount of dilute sulfuric acid is employed to achieve a pH of 0 to about 4, preferably 0 to about 1. Additional dilute sulfuric acid is added to maintain the pH at the desired value during leaching.

Copper may then be recovered from the copper sulfate in the leached solution by any suitable procedure, e.g. preferably by electrowinning of the copper. If desired, the solution may be reduced to copper powder by reduction of the leached solution with hydrogen.

Alternatively, the roasting step described above may be eliminated by removing magnetite from the reaction mixture formed in the reaction of the sulfide ore with sulfur dioxide gas. The magnetite is removed by means of magnetic separation using conventional dry and wet magnetic separators. The magnetite so separated, after pelletizing, is a high grade product useful as feed to an iron blast furnace.

The cyclic process of this invention serves to extract copper from sulfide ores containing copper and iron with substantially no pollution of the air, ground or water. Moreover, it enables the recovery of copper, sulfur and iron values in a highly economical and efficient manner.

DETAILED DESCRIPTION OF THE DRAWING

Referring to the flow sheet depicting practice of the present invention, a sulfide ore containing copper, iron and sulfur, exemplified by a chalcopyrite concentrate containing 26.21% Cu, 30.91% Fe and 27.74% S, is premixed with an amount of powdered coal determined experimentally to give the maximum rate of production of elemental sulfur at 900° C. Sulfur dioxide from Step 2 is mixed with the amount of oxygen or air necessary to produce a temperature of 900° C. and is then reacted in stoichiometric excess with the ore for about 6 hours to form elemental sulfur, magnetite and a copper sulfide (Step 1).

The elemental sulfur and unreacted sulfur dioxide are passed to a condenser, and the elemental sulfur is recovered as liquid sulfur. The unreacted sulfur dioxide is sent to a sulfuric acid regenerator. The residual solids are then reacted with excess 98% sulfuric acid at a temperature of 315° C. to form ferric sulfate and copper sulfate, both of which are insoluble in the sulfuric acid (Step 2). The solids comprising gangue, in addition to the ferric sulfate and copper sulfate, are filtered from the excess sulfuric acid and roasted at 800° C. for about one hour (Step 3). The excess sulfuric acid is sent to a sulfuric acid storage tank. During the roasting operation, entrained sulfuric acid is volatilized and sulfur trioxide is formed from the ferric sulfate, leaving iron oxides ($Fe_3O_4$, $Fe_2O_3$, FeO) as the residue. The gases evolved, composed of sulfur trioxide, sulfur dioxide, water vapor and oxygen, are sent to the sulfuric acid regenerator for recoversion to sulfuric acid and returned via the sulfuric acid storage tank to Step 2. The roasted solids are then ground and leached with sulfuric acid having a pH of 2 (Step 4). The pH is maintained at 2 during leaching by addition of sulfuric acid. When the pH becomes constant, the solids comprising iron oxides and gangue are filtered from the leachant. The leachant containing copper sulfate is finally subjected to eletrolysis with a copper cathode to recover metallic copper (Step 5). The electrolysis regenerates sulfuric acid from the sulfate anion of the copper sulfate. In order to maintain the sulfuric acid concentration of the electrolyte (leachant) at desired value suitable amount of the electrolyte is bled off periodically. The bleed is returned to Step 3 where the sulfuric acid is volatilized and sent to the sulfuric acid regenerator.

Since various changes and modifications can be made in the invention without departing from the spirit thereof, the invention is deemed to be limited only by the scope of the appended claims.

We claim:

1. A cyclic process for recovering copper from sulfide ores containing copper and iron which comprises:

a. reacting the sulfide ore with sulfur dioxide gas at a temperature of at least about 500° C., thereby forming elemental sulfur, magnetite and a copper sulfide
b. condensing and removing the elemental sulfur from the reaction mixture,
c. reacting the residual solids with concentrated sulfuric acid at a temperature of about 180° to 500° C., thereby forming copper sulfate and sulfur dioxide gas,
d. recycling the sulfur dioxide gas to step (a)
e. separating the solids comprising magnetite and copper sulfate from the liquid phase,
f. roasting the separated solids at a temperature of about 400° to 900° C.,
g. leaching the roasted solids with an aqueous solution comprising water or dilute sulfuric acid, thereby solubilizing the copper sulfate,
h. separating the solids comprising magnetite and gangue from the liquid phase and
i. recovering copper from the solubilized copper sulfate.

2. The process of claim 1 wherein the sulfide ore is chalcopyrite.

3. The process of claim 2 wherein step (a) is carried out at a temperature of at least about 650° C.

4. The process of claim 2 wherein step (c) is carried out at a temperature of about 300° to 400° C.

5. The process of claim 2 whereisn step (f) is carried out at a temperature of about 600° to 700° C.

6. The process of claim 2 wherein the aqueous solution of step (g) is dilute sulfuric acid.

7. The process of claim 6 wherein the dilute sulfuric acid is employed in amount to produce a pH of 0 to about 4.

8. The process of claim 6 wherein the dilute sulfuric acid is employed in amount to produce a pH of 0 to about 1.

9. A cyclic process for recovering copper from copper sulfite ores containing copper and iron which comprises:
a. reacting the sulfide ore with sulfur dioxide gas at a temperature of at least about 500° C., thereby forming elemental sulfur, magnetite and a copper sulfide,
b. condensing and removing the elemental sulfur from the reaction mixture,
c. removing magnetite from the residual solids by magnetic separation,
d. reacting the solids with concentrated sulfuric acid at a temperature of about 180° to 500° C., thereby forming copper sulfate and sulfur dioxide gas,
e. recycling the sulfur dioxide gas to step (a),
f. leaching the solids with an aqueous solution comprising water or dilute sulfuric acid, thereby solubilizing the copper sulfate and
g. recovering copper from the solubilized copper sulfate.

10. The process of claim 9 wherein the sulfide ore is chalcopyrite.

11. The process of claim 10 wherein step (a) is carried out at a temperature of at least about 650° C.

12. The process of claim 10 wherein step (d) is carried out at a temperature of about 300° to 400° C.

13. The process of claim 10 wherein the aqueous solution of step (g) is dilute sulfuric acid.

14. The process of claim 13 wherein the dilute sulfuric acid is employed in amount to produce a pH of 0 to about 4.

15. The process of claim 13 wherein the dilute sulfuric acid is employed in amount to produce a pH of 0 to about 1.

* * * * *